United States Patent [19]

Tanaka et al.

[11] Patent Number: 4,680,366
[45] Date of Patent: Jul. 14, 1987

[54] FABRIC-FINISHING AGENT CONTAINING A NOVEL ORGANOPOLYSILOXANE

[75] Inventors: Masaki Tanaka; Shoji Ichinohe, both of Gunma, Japan

[73] Assignee: Shin-Etsu Chemical Co., Ltd., Tokyo, Japan

[21] Appl. No.: 875,328

[22] Filed: Jun. 17, 1986

[30] Foreign Application Priority Data

Jun. 20, 1985 [JP] Japan .................................. 60-134489

[51] Int. Cl.$^4$ ............................................. C08G 77/04
[52] U.S. Cl. ................................... 528/27; 106/287.11; 106/287.12; 524/375; 524/588; 528/12; 528/14; 528/37; 528/38; 556/413
[58] Field of Search ........................ 528/27, 37, 38, 12, 528/14; 556/413; 524/588, 375; 106/287.11, 287.12

[56] References Cited

U.S. PATENT DOCUMENTS

| | | | |
|---|---|---|---|
| 4,156,677 | 5/1979 | Williams et al. | 528/38 |
| 4,507,455 | 3/1985 | Tangney et al. | 528/38 |

*Primary Examiner*—Melvyn I. Marquis
*Attorney, Agent, or Firm*—Jules E. Goldberg

[57] ABSTRACT

A novel organopolysiloxane is disclosed which has a molecular structure having, in addition to conventional monovalent hydrocarbon groups bonded to the silicone atoms, aminoalkyl groups, e.g. $-(CH_2)_3NH_2$ and $-(CH_2)_3NH-CH_2CH_2-NH_2$, and polyoxyalkylene-substituted aminoalkyl groups, e.g. $-CH_2)_3NH-CH_2-CH(OH)-CH_2-O-(C_2H_4O)_{21}(C_3H_6O)_{21}C_8H_{17}$.
The novel organopolysiloxane, which is soluble or emulsifiable in water without using an emulsifying agent, is useful as the principal ingredient of a fabric-finishing composition and capable of imparting very pleasant touch of softness and excellent antistatic performance to the fabric materials treated therewith.

4 Claims, No Drawings

FABRIC-FINISHING AGENT CONTAINING A NOVEL ORGANOPOLYSILOXANE

BACKGROUND OF THE INVENTION

The present invention relates to a silicone-containing fabric-finishing composition and a method of finishing a fabric material using the same. More particularly, the invention relates to a fabric-finishing agent containing a novel silicone or organopolysiloxane as the principal ingredient and a method of finishing a fabric material using the same by which the fabric material can be imparted with markedly improved antistatic effect and pleasantly soft touch.

It is well known that, among various types of silicone-containing fabric-finishing agents, those containing a modified organopolysiloxane having aminoalkyl groups or epoxy groups impart the fabric materials treated therewith with excellent softness and pleasant touch (see, for example, Japanese Patent Publications Nos. 48-1480, 54-3617 and 59-26707). It is also known that sewbility of textiles can be improved by use of a textile oil which is an oily polymer such as dimethylpolysiloxanes or dimethylsilicone fluids.

These silicones, i.e. dimethylsilicone and modified silicone fluids, are indeed effective in respect of the lubricity and softness imparted to the fabric materials finished therewith. A serious problem in the use thereof is, however, the disadvantageous phenomenon of increased electrostatic charging on the fabric materials treated therewith due to the generally high electric insulation inherent in silicones. Namely, clothes of a silicone-finished textile may be electrostatically charged to cause an unpleasant shock to the wearer by the discharge. Charged clothes may readily adsorb the dusts in the ambient air to be dirty increasingly. When threads treated with a silicone as a lubricating agent are used in sewing, drawbacks are sometimes caused that the threads are entangled or the desired effect of lubrication is insufficient when the threads are electrostatically charged.

SUMMARY OF THE INVENTION

The present invention therefore has a primary object to provide a silicone-containing fabric-finishing agent free from the above described disadvantages and problems in the conventional silicone-containing fabric-finishing agents.

The principal ingredient of the inventive silicone-containing fabric-finishing agent is an organopolysiloxane, which is a novel compound not known in the prior art or not described in any literatures, represented by the average unit formula $$R^1_a R^2_b Y_c Z_d SiO_{(4-a-b-c-d)/2},\quad\text{(I)}$$

in which $R^1$ is a monovalent hydrocarbon group having 1 to 20 carbon atoms, $R^2$ is a monovalent group selected from the class consisting of hydroxy group and alkoxy groups having 1 to 20 carbon atoms, Y is an amino-substituted monovalent hydrocarbon group represented by the general formula

$$-R^3+\!NH-CH_2CH_2)_e NH-R^4,\quad\text{(II)}$$

$R^3$ being a divalent hydrocarbon group having 1 to 8 carbon atoms, $R^4$ being a hydrogen atom or a monovalent hydrocarbon group having 1 to 20 carbon atoms and e being zero or 1, Z is a substituted monovalent hydrocarbon group represented by the general formula

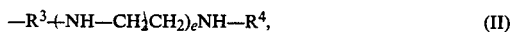

$$-R^3+\!NH-CH_2CH_2)_e NR^4+\!CH_2-CHOH-CH_2-O-C_2H_4O)_p(C_3H_6O)_q R^5,\quad\text{(III)}$$

$R^3$ and $R^4$ each having the same meaning as defined above, $R^5$ being a hydrogen atom or a monovalent hydrocarbon group having 1 to 20 carbon atoms, e being zero or 1, p being a positive integer not exceeding 50 and q being zero or a positive integer not exceeding 50, a is a positive number not exceeding 3, b is zero or a positive number not exceeding 3 and c and d are each a positive number not exceeding 1 with the proviso that $a+b+c+d$ is smaller than 4.

The fabric-finishing agent of the invention is prepared by dissolving or dispersing the above described organopolysiloxane in a suitable liquid dispersing medium such as water or an organic solvent into a form of an aqueous or organic solution or aqueous emulsion

DETAILED DESCRIPTION OF THE PREFERRED EMBODIMENTS

As is described in the above given summary, the feature of the inventive fabric-finishing agent consists in the use of the above defined novel organopolysiloxane as the principal ingredient thereof. In respect of the effect of imparting softness and lubricity to the fabric materials finished with the finishing agent, the inventive silicone-containing fabric-finishing agent is as effective as conventional agents containing a silicone fluid modified with amino or epoxy groups and is still much more advantageous in respect of the antistatic performance of the fabric materials treated therewith than those treated with conventional silicone-containing fabric-finishing agents.

Another advantage in the inventive fabric-finishing agent is the versatility of the principal ingredient in respect of the balance between the hydrophobicity and hydrophilicity which can be easily controlled by adequately selecting the weight fraction of the hydrophilic polyoxyalkylene groups in the molecular structure of the organopolysiloxane which can be insoluble in water or highly soluble in water depending on the weight fraction of such groups. If desired, the organopolysiloxane is imparted with self-emulsifiability so that the fabric-finishing agent of an aqueous emulsion type prepared of such an organopolysiloxane without using an emulsifier is very stable in storage and free from the problems of appearance of oil spots and the phenomenon of gum-up in the process of fabric treatment due to the instability of the emulsion.

The novel organopolysiloxane as the principal ingredient of the inventive fabric-finishing agent is represented by the above given average unit formula (I). The symbols $R^1$, $R^2$, Y, Z, a, b, c and d in the formula each have the meaning defined above. In particular, the symbol $R^1$ denotes a monovalent hydrocarbon group having 1 to 20 or, preferably, 1 to 8 carbon atoms exemplified by alkyl groups, e.g. methyl, ethyl, propyl and butyl groups, alkenyl groups, e.g. vinyl and allyl groups, aryl groups, e.g. phenyl and tolyl groups, aralkyl groups, e.g. benzyl group, and cycloalkyl groups, e.g. cyclohexyl group. These hydrocarbon groups may be substituted for a part or all of the hydrogen atoms by substituents such as halogen atoms and cyano groups. It is optional that the organopolysiloxane has two kinds or more of the groups denoted by $R^1$ in a single molecule. The symbol $R^2$ denotes a hydroxy group or an alkoxy

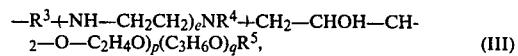

group such as methoxy, ethoxy, propoxy and butoxy groups. The symbol Y denotes an amino-substituted monovalent hydrocarbon group represented by th general formula (II), in which $R^3$ is a divalent hydrocarbon group or alkylene group having 1 to 8 carbon atoms such as methylene, ethylene, propylene and butylene groups and $R^4$ is a hydrogen atom or an amino-substituted or unsubstituted monovalent hydrocarbon group which can be selected from the same class of the groups given as the examples of the monovalent hydrocarbon group denoted by $R^1$.

Particular examples of the group denoted by Y include those groups expressed by the structural formulas given below, in which the symbols Me, Et, iPr, tBu, Ph and $C_6H_{11}$ are each an abridgment for methyl, ethyl, isopropyl, tert-butyl, phenyl and cyclohexyl groups, respectively: $-(CH_2)_3NH-C_6H_{11}$; $-(CH_2)_3NH-Ph$; $-(CH_2)_3NH-CH_2-Ph$; $-(CH_2)_3NH-(CH_2)_2Ph$; $-(CH_2)_4NH_2$; $-(CH_2)_3NH-Me$; $-(CH_2)_2NH-iPr$; $-CH_2-NH_2$; $-CH_2-NH-tBu$; $-(CH_2)_3NH-(CH_2)_3NEt_2$; $-(CH_2)_3NH-(CH_2)_3NH-iPr$; $-(CH_2)_3NH-(CH_2)_2NH-Me$; and $-(CH_2)_3NH-(CH_2)_4NPh_2$.

The symbol Z denotes a group represented by the above given general formula (III) in which each of the symbols $R^3$, $R^5$, e, p and q has the meaning as defined before. Such a group can be introduced into the molecule of the organopolysiloxane by the reaction of a silicon-bonded group of the formula $-R^3-(-NH-CH_2CH_2-)_e-NH-R^4$, which is a particular group given by the symbol Y, with a polyoxyalkylene glycidyl ether of the general formula

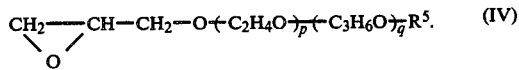   (IV)

A typical procedure for the preparation of the organopolysiloxane represented by the average unit formula (I) is given below for the purpose of exemplification. Thus, a mixture composed of a hexamethyldisiloxane $Me_3Si-O-SiMe_3$, a cyclic dimethylpolysiloxane of the formula

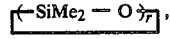, in which r is a positive integer of 3 to 8 and another cyclic organopolysiloxane of the formula having aminoalkyl groups

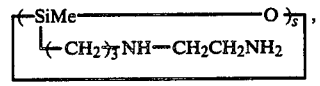, in which s is a positive integer of 3, 4 or 5, is subjected to a ring-opening polymerization in the presence of a strongly alkaline catalyst such as potassium hydroxide to form a linear trimetylsiloxy-terminated diorganopolysiloxane of the formula

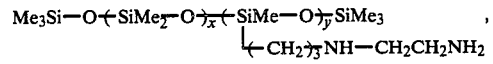

in which x and y are each a positive integer. This aminoalkylmodified diorganopolysiloxane is further reacted with a polyoxyalkylene glycidyl ether of the general formula (IV) given above so as to bond the polyoxyalkylene moiety to a part of the terminal amino groups $-NH_2$ having active hydrogen atoms.

While, in the above mentioned reaction with amino and the epoxy groups, a mole of the polyoxyalkylene glycidyl ether can be reacted with a mole of the amino groups in the organopolysiloxane, the organopolysiloxane of the average unit formula (I) should have at least one amino group per molecule unreacted with the glycidyl ether when the organopolysiloxane should be the principal ingredient in the fabric-finishing agent in order to exhibit the full softening effect as desired. Therefore, the amount of the polyoxyalkylene glycidyl ether to be reacted relative to the amino groups in the organopolysiloxane should be substantially smaller than equimolar.

The reaction of the aminoalkyl-modified organopolysiloxane and the polyoxyalkylene glycidyl ether may be performed at room temperature, if necessary, in an organic solution by dissolving the reactants in a suitable organic solvent such as aliphatic and aromatic hydrocarbon solvents, chlorinated hydrocarbon solvents, alcohols, ketones, esters and the like. The temperature of the reaction mixture should preferably be increased, for example, to 80° to 140° C. Although the reaction can proceed even in the absence of any catalyst, it is optional when acceleration of the reaction is desired to admix the reaction mixture with a suitable catalyst compound such as an organic acid, e.g. acetic acid, or an alkali, e.g. sodium and potassium hydroxides.

The organopolysiloxane represented by the average unit formula (I) is usually in an oily form when the summation of the subscripts a+b+c+d is in the proximity of 2. The oily organopolysiloxane can be either soluble or insoluble in water depending on the weight fraction of the hydrophilic polyoxyalkylene groups. When it is soluble in water, it is a convenient and advantageous way that the fabric-finishing agent of the invention is prepared by merely dissolving the organopolysiloxane in water in a suitable concentration. When it is insoluble in water but soluble in organic solvents such as toluene, xylene, trichloroethylene, kerosine and the like, the fabric-finishing agent of the invention can be either an organic solution of the organopolysiloxane in such a solvent in a suitable concentration or an aqueous emulsion with the organopolysiloxane as the dispersed phase. When the organopolysiloxane is more than adequately hydrophobic, the aqueous emulsion should be prepared by use of a surface active agent which may be a non-ionic surface active agent or a cationic surface active agent such as quaternary ammonium salts. When the organopolysiloxane is adequately balanced between hydrophobicity and hydrohilicity by containing the polyoxyalkylene groups in a relatively large weight fraction, the organopolysiloxane acquires self-emulsifiability so that a fabric-finishing agent in the form of an aqueous emulsion with excellent stability can be prepared even without using any surface active agent.

The silicone-containing fabric-finishing agent of the invention described above is useful for finishing various kinds of fabric materials of not only natural but also synthetic fibers with an object to impart softness of very pleasant touch without inducing the undesirable phenomenon of increased electrostatic charging by virtue of the hydrophilic nature of the organopolysiloxane. The inventive fabric-finishing agent can be used in the applications as an antistatic softening agent of textiles, e.g. woven cloths and non-woven fabrics, antistatic lubricating agent for threads used in sewing and so on. The novel organopolysiloxane disclosed here is also useful as a base ingredient in an antistatic agent for plastic films and in an antifoam agent of the self-emulsification type.

In the following, the novel organopolysiloxanes and fabric-finishing agents prepared thereof are described in more detail by way of examples, in which the values of viscosity given are all the values obtained by the measurement carried out at 25° C.

EXAMPLE

Into a flask of 1000 ml capacity were introduced 48.6 g of hexamethyldisiloxane, 600 g of a mixture of cyclic dimethylpolysiloxanes of the formula

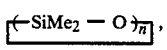

in which n is a positive integer of 3 to 6, 144.0 g of cyclic aminoalkyl-modified diorganopolysiloxanes of the formula

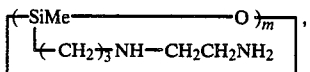

in which m is a positive integer of 3 to 6, and 0.11 g of potassium hydroxide and the mixture was heated at 140° C. for 6 hours with agitation under a gentle stream of nitrogen gas to effect the ring-opening polymerization of the cyclic polysiloxanes. After completion of the reaction, 0.80 g of ethylene chlorohydrin was added to the reaction mixture followed by further heating thereof at 110° C. for 2 hours to neutralize the potassium hydroxide. Subsequently, the mixture was heated under reduced pressure of 5 mmHg at 130° to 140° C. for 3 hours to re-move volatile matters. The resultant reaction product was a trimethylsiloxy-terminated aminoalkyl-modified linear diorganopolysiloxane expressed on an average by the formula

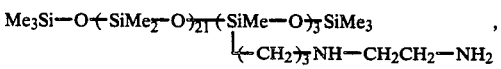

which is referred to as the Siloxane A hereinbelow.

Separately, another trimethylsiloxy-terminated aminoalkyl-modified linear diorganopolysiloxane, referred to as the Siloxane B, was prepared in the same manner as above except that the starting reaction mixture was composed of 24.3 g of hexamethyl disiloxane, 666 g of the cyclic dimethylpolysiloxanes, 72 g of the cyclic aminoalkyl-modified diorganopolysiloxanes and 0.11 g of potassium hydroxide. The product was expressed on an average by the formula

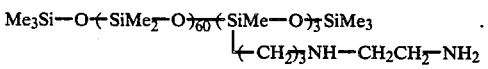

Further separately, a third aminoalkyl-modified linear diorganopolysiloxane terminated at both molecular chain ends each with a dimethyl methoxy siloxy group, referred to as the Siloxane C hereinbelow, was prepared in substantially the same procedure as above except that the reaction mixture was composed of 29.1 g of 1,1,3,3-tetramethyl 1,3-dimethoxy disiloxane, 666 g of the cyclic dimethylpolysiloxanes, 52.7 g of a cyclic methyl 3-aminopropyl polysiloxanes of the formula

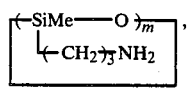

in which m is a positive integer of 3 to 8. The product was expressed on an average by the following formula:

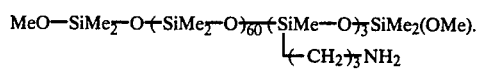

Following is a description of the preparation of fabric-finishing agents according to the invention. Thus, a reaction mixture was formed in a flask of 3 liter capacity by introducing thereinto 300 g of the Siloxane A obtained as described above, 700 g of a polyoxyalkylene octyl glycidyl ether expressed by the structural formula

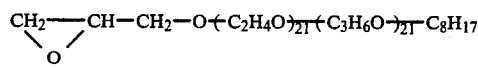

and 1000 g of toluene and the reaction mixture was heated under reflux of the solvent for 10 hours with agitation followed by removal of the solvent by distillation to give 920 g of a viscous oily product having a viscosity of 3250 centistokes at 25° C., refractive index of 1.448 at 20° C. and amine equivalent of 1500. This product was a linear diorganopolysiloxane expressed on an average by the following formula:

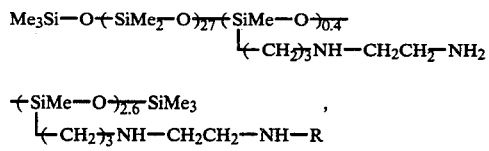

in which R is a polyoxyalkylene group of the formula —CH$_2$—CH(OH)—CH$_2$—O—C$_2$H$_4$O)$_{21}$(C$_3$H$_6$O)$_{21}$C$_8$H$_{17}$. This product is referred to as the Siloxane I hereinbelow.

Another organopolysiloxane, referred to as the Siloxane II hereinbelow, was prepared in substantially the same manner as above except that the reaction mixture was composed of 500 g of the Siloxane B, 500 g of the same polyoxyalkylene octyl glycidyl ether as used in the preparation of the Siloxane I and 1000 g of toluene and the reaction mixture was heated at 100° to 110° C. for 10 hours. The yield of the product was 921 g. The product had a viscosity of 5820 centistokes at 25° C., refractive index of 1.434 at 20° C. and amine equivalent of and expressed on an average by the formula

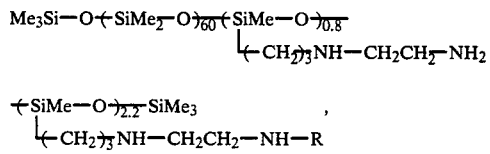

in which R has the same meaning as defined above.

Still further, a third organopolysiloxane, referred to as the siloxane III hereinbelow, was prepared in substantially the same manner as above by replacing the Siloxane B with the same amount of the Siloxane C. The yield of the product was 941 g. The product had a viscosity of 6880 centistokes at 25° C., refractive index of 1.432 at 20° C. and amine equivalent of 3300 and expressed on an average by the formula

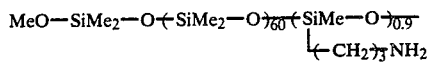

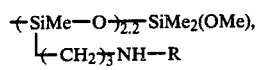

in which R has the same meaning as defined above.

The Siloxane I prepared in the above described manner was soluble in water and the Siloxanes II and III were each dispersible in water without using an emulsifier, i.e. self-emulsifiable. They were each dissolved or dispersed in water in a concentration of 0.5 % by weight. For comparison, the Siloxanes B and C, each of which had no solubility or dispersibility in water, were each emulsified in water. Thus, 20 parts by weight of the Siloxane were emulsified in 75 parts by weight of water by use of 5 parts by weight of a polyoxyethylene octyl phenyl ether having an HLB value of 13.5 as a surface active agent and the emulsion was diluted 20 times to give a diluted emulsion containing 1.0 % by weight of the Siloxane.

The aqueous solution and emulsions were each used for the treatment of a pure polyester cloth to examine the touch or softness and the antistatic performance of the treated cloth. Thus, the cloth was dipped in the treatment solution or emulsion and nipped to give a silicone pick-up of 0.2 % followed by drying by heating first at 100° C. for 2 minutes and then at 150° C. for 2 minutes. The results were as shown in the table below, according to which the Siloxanes B and C gave excellent soft touch to the treated cloth but were apparently inferior in respect of the voltage of the electrostatically charged cloth and the half-life period of the charge while the Siloxanes I, II and III or, in particular, II and III, were very satisfactory not only in the soft touch but also in the antistatic performance of the cloth treated therewith.

TABLE

| Siloxane | Touch | Voltage, mV | Half-life period, seconds |
|---|---|---|---|
| I | Good | 2.8 | 1.0 |
| II | Excellent | 3.5 | 1.6 |
| III | Excellent | 3.5 | 1.9 |
| B | Excellent | 3.7 | at least 300 |
| C | Excellent | 3.8 | at least 300 |

What is claimed is:

1. An organopolysiloxane represented by the average unit formula

in which $R^1$ is a monovalent hydrocarbon group having 1 to 20 carbon atoms, $R^2$ is a monovalent group selected from the class consisting of hydroxy group and alkoxy groups having 1 to 20 carbon atoms, Y is an amino-substituted monovalent hydrocarbon group represented by the general formula

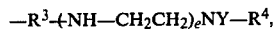

$R^3$ being a divalent hydrocarbon group having 1 to 8 carbon atoms, $R^4$ being a hydrogen atom or a monovalent hydrocarbon group having 1 to 20 carbon atoms and e being zero or 1, Z is a substituted monovalent hydrocarbon group represented by the general formula

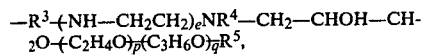

$R^3$ and $R^4$ each having the same meaning as defined above, $R^5$ being a hydrogen atom or a monovalent hydrocarbon group having 1 to 20 carbon atoms, e being zero or 1, p being a positive integer not exceeding 50 and q being zero or a positive integer not exceeding 50, a is a positive number not exceeding 3, b is zero or a positive number not exceeding 3 and c and d are each a positive number not exceeding 1 with the proviso that a+b+c+d is smaller than 4.

2. The organopolysiloxane as claimed in claim 1 wherein the monovalent hydrocarbon group denoted by $R^1$ is a methyl group.

3. A fabric-finishing composition which comprises:
   (a) a liquid medium; and
   (b) an organopolysiloxane represented by the average unit formula

in which $R^1$ is a monovalent hydrocarbon group having 1 to 20 carbon atoms, $R^2$ is a monovalent group selected from the class consisting of hydroxy group and alkoxy groups having 1 to 20 carbon atoms, Y is an amino-substituted monovalent hydrocarbon group represented by the general formula

$R^3$ being a divalent hydrocarbon group having 1 to 8 carbon atoms and $R^4$ being a hydrogen atom or an amino-substituted or unsubstituted monovalent hydrocarbon group having 1 to 20 carbon atoms, Z is a substituted monovalent hydrocarbon group represented by the general formula

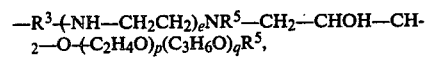

$R^3$ and $R^4$ each having the same meaning as defined above, $R^5$ being a hydrogen atom or a monovalent hydrocarbon group having 1 to 20 carbon atoms, e being zero or 1, p being a positive integer not exceeding 50 and q being zero or a positive integer not exceeding 50, a is a positive number not exceeding 3, b is zero or a positive number not exceeding 3 and c and d are each a positive number not exceeding 1 with the proviso that a+b+c+d is smaller than 4, dissolved or dispersed in the liquid medium.

4. The fabric-finishing composition as claimed in claim 3 wherein the monovalent hydrocarbon group denoted by $R^1$ is a methyl group.

* * * * *